United States Patent [19]
DeKraker

[11] Patent Number: 5,400,618
[45] Date of Patent: Mar. 28, 1995

[54] INTEGRATED BATCH AUTO-REFRIGERATIVE DEWAXING EMPLOYING THERMOCOMPRESSORS

[75] Inventor: Abraham R. DeKraker, Sugarland, Tex.

[73] Assignee: Exxon Research & Engineering Co., Florham Park, N.J.

[21] Appl. No.: 143,426

[22] Filed: Oct. 26, 1993

[51] Int. Cl.⁶ .................... B01D 9/04; C02F 1/22
[52] U.S. Cl. ........................ 62/532; 62/500; 196/14.5; 208/37
[58] Field of Search ............ 62/123, 532, 116, 500; 196/14.5; 208/28, 37

[56] References Cited

U.S. PATENT DOCUMENTS

| | | | |
|---|---|---|---|
| 2,119,749 | 6/1938 | Merrill | 196/19 |
| 2,133,618 | 10/1938 | Hopper et al. | 196/18 |
| 2,530,976 | 11/1950 | Martin | 62/170 |
| 2,909,475 | 10/1959 | Bushnell | 208/35 |
| 3,303,121 | 2/1967 | Li et al. | 196/14.5 |
| 4,319,962 | 3/1982 | Ryan | 196/14.5 |
| 4,357,669 | 11/1982 | Alverson et al. | 196/14.5 |
| 4,447,311 | 5/1984 | Fowles et al. | 208/37 |
| 5,084,187 | 1/1992 | Wilensky | 62/532 |

OTHER PUBLICATIONS

"Steam Jet Thermocompressors" Manufacturer Brochure, Dry-Con Inc.
"Automatic Control Comes to the Batch Process"
Breedlove, Petroleum Processing, pp. 220–221, May 1957.
"Dewaxing Oils in Propane Solution With Self–Refrigeration" Bahlke, et al. Refiner & Natural Gasoline Manufacturer, vol. 12, No. 6, pp. 229–234, Jun. 1933.
"Evaporation" Kirk–Othmer Encyclopedia of Chemical Technology, 3rd Ed. vol. 9, pp. 472–493.

Primary Examiner—Ronald C. Capossela
Attorney, Agent, or Firm—Joseph J. Allocca

[57] ABSTRACT

Batch auto-refrigerative dewaxing processes employing at least two batch chilling vessels can be improved by integrating the batch auto-refrigerative dewaxing chilling cycles of the chilling vessels so as to have their cycles of operation overlap and use thermocompressors to recover the energy of the hot, high pressure cycle stream of one vessel by operation on the cooler, low pressure cycle stream of the other vessel to increase the pressure of said low pressure cycle stream. The overlap operation of the multiple batch chillers integrated through the thermocompressor will also permit running the cool, low pressure cycle to a pressure even lower than atmospheric without inleakage of air because of the vacuum effect generated by the hot, higher pressure stream running through the thermocompressor. Autorefrigerative dewaxing employs liquified normally gaseous solvents as the chilling solvents such as $C_3$–$C_4$ alkanes/alkenes e.g. propane, propylene, butane, butylene and mixtures thereof.

1 Claim, 3 Drawing Sheets

INTEGRATED BATCH AUTO-REFRIGERATIVE DEWAXING EMPLOYING THERMOCOMPRESSORS

FIELD OF THE INVENTION

The present invention relates to batch auto-refrigerative solvent dewaxing chilling process wherein at least two independent batch auto-refrigerative dewaxing solvent chilling vessels, running in sequence and not in parallel resulting in energy conservation, an increase in chiller capacity, and the production of a dewaxed oil of lower pour point and/or better quality. Autorefrigerative dewaxing solvents are liquified, normally gaseous low molecular weight aliphatic alkanes and alkenes, typically $C_3$–$C_4$ alkanes and alkenes. Preferred autorefrigerative dewaxing solvents are propane, propylene, butane, butylene and mixtures thereof, more preferably propane, butane and mixtures thereof.

DESCRIPTION OF RELATED ART

By their very nature, batch autorefrigerative dewaxing chillers operate in a non-continuous flow mode and with severe variations in the pressures of the non-continuous flow streams.

The use of thermocompressors for energy conservation by the recovery of energy from high pressure streams by increasing the pressure of another and different low pressure stream has been known for some time. However, to achieve this energy conservation it is necessary that the high pressure stream be a continuous flow stream and that the low pressure stream also be a continuous flow stream.

It would appear that thermocompressors and batch autorefrigerative chilling processes are inherently incompatible.

THE PRESENT INVENTION

Figure 1:
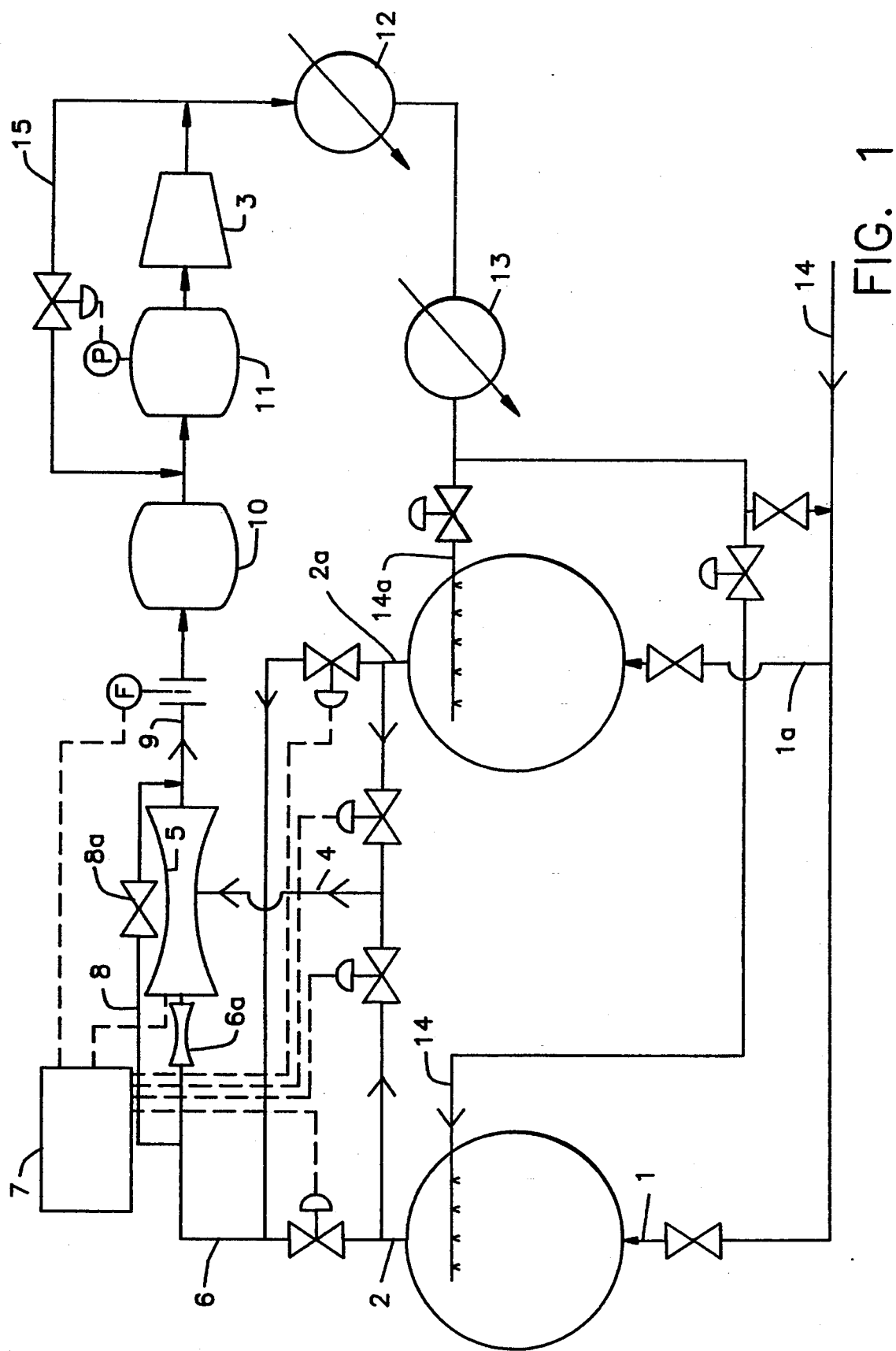
FIG. 1 is a schematic of the present invention showing a batch chiller configuration employing a thermocompressor.

It has been discovered that the batch autorefrigeration dewaxing process and thermocompressors can be integrated to result in energy conservation and improvement in the dewaxing process in terms of product quality. For the sake of simplicity, autorefrigerative dewaxing solvent will be identified as propane throughout the balance of this specification.

The present invention is directed to a method for improving the energy efficiency and increasing the chiller capacity and production of lower pour point dewaxed oil in a batch autorefrigerative solvent dewaxing chilling process comprising running the batch autorefrigerative solvent dewaxing process employing at least first and second dewaxing chiller vessels running in sequence and not in parallel wherein operation of the vessel is integrated through a thermocompressor so that as the first chiller vessel, charged with a mixture of waxy oil to be dewaxed and hot-high pressure autorefrigerative dewaxing solvent, vents hot-high pressure autorefrigerative solvent to effect the chilling at the beginning of its chilling cycle such hot-high pressure autorefrigerative solvent is sent to the thermocompressor to enable such thermocompressor to pull and recompress cool, low pressure autorefrigerant venting from the second chiller which is further along in its chilling cycle as compared to the first chiller and was similarly charged at the beginning of its chilling cycle with a mixture of waxy oil to be dewaxed and hot-high pressure autorefrigerative dewaxing solvent, the compressed low pressure autorefrigerative dewaxing solvent from the thermocompressor being sent to a recompression compressor for further compression into high pressure autorefrigerative dewaxing solvent for reuse in the dewaxing process whereby through the overlapping of the chilling cycles of the two batch chillers continuous flows of low pressure and high pressure autorefrigerative dewaxing solvent streams are available to the thermocompressors permitting the efficient operation of the thermocompressor and the increase in the efficiency of the batch autorefrigerative dewaxing process.

In the present invention the propane dewaxing process employs at least a first and a second batch dewaxing chiller vessel, said vessels running in sequence and not in parallel. The sequentially running batch propane chillers are integrated through a thermocompressor so that the hot, high pressure propane stream from the 1st chiller at the beginning of its chilling cycle, acts through the thermocompressor on the cool, low pressure stream from the second chiller which is further along in its chilling cycle as compared to the first chiller. By overlapping the cycles of the batch chillers the high pressure stream and low pressure stream are made available to the thermocompressor. Also, by overlapping the cycles and integrating their availability to the thermocompressor a continuous flow of low pressure streams and high pressure streams are created which permit the efficient operation of the thermocompressors. By use of the thermocompressor, the inefficient throttling of propane during the first part of the chilling step, when the chiller pressure and, therefore, the throttling action is greatest, is also reduced or eliminated.

In the propane batch chiller dewaxing process, batch chilling is employed to chill propane/waxy oil solution from an initial temperature of about 30° C. down to a filtration temperature of about −30° C. A warm, empty chilling vessel is charged with warm liquid propane waxy oil solution at about 30° C. and at a pressure of about 90–120 psia. By venting the propane as gaseous propane the pressure is reduced in the chiller. This reduction in pressure is accompanied by a reduction in the temperature of the solution resulting in the solution's chilling thereby producing a slurry of wax crystals in dewaxed oil. This slurry is subsequently sent to liquid/solid separation means such as rotary filters or centrifuges.

The vented, cold low pressure vaporous propane is recompressed in a propane recompression compressor, liquified and mixed at elevated pressure and temperature with a fresh charge of waxy oil to produce a propane/waxy oil solution which is introduced into a warm, empty chilling vessel and the entire chilling sequence is repeated.

To maximize operation and permit a semi-continuous flow of solid wax/dewaxed oil slurry to the liquid/solid separation means it is common to employ a number of propane dewaxing chillers operating in sequence so that as one chiller is being charged to begin its chilling cycle, the other chiller is reaching the end of its chilling cycle and is being emptied of its wax/dewaxed oil slurry. At least 2 chillers are employed.

The chilling rate in the warm, high pressure charge vessel is controlled by the rate at which the propane is allowed to vent from the chiller. Typically, a constant mass flow rate of propane is used. This results in a nearly linear chilling profile but is marked by a great variation in the pressure of the propane venting from the vessel. The initial volumes of propane are at high pressure while the later volumes, toward the end of the chilling cycle, are at a much reduced pressure. Because the propane compressor suction on the propane recovery recompression compressor must be maintained constant, the initial high pressure in the chiller must be dropped across a flow control valve to achieve the dual and conflicting goals of constant mass flow from the chiller and constant suction pressure at the propane recompression compressor.

It has been discovered that a thermocompressor can be utilized in the multi vessel, sequential propane batch chilling system to compress low pressure vented propane from the cold chiller using high pressure propane from the warm chiller.

Integrating the multi vessel propane batch chilling process with the thermocompressor allows for the efficient overlapping of the sequential batch chilling process since the high pressure propane acting through the thermocompressor enables the thermocompressor to pull vapor from the low pressure chiller. It provides a useful means of lowering the pressure of the vapor from the high pressure chiller down to the pressure of the propane recompression compressor suction. The discharge pressure of the thermocompressor (which would be the recompression compressor suction pressure) would be intermediate to the pressures in the warm and cold chillers. This pressure would be higher than the current recompression compressor suction pressure and would increase the capacity of the recompression compressor and/or reduce its energy consumption since the propane it would be recompressing would already be at a higher pressure.

Absent the use of a thermocompressor in such an integrated system, overlapping of just the chiller cycles directly to the recompression compressor would result in a fluctuating flow rate to the compressor. Toward the end of a chilling cycle the mass flow rate from a cold chiller falls off due to the low pressure in the cold chiller. To augment the mass flow rate of gas to the compressor gas from the warm chiller can be used, provided that chiller is ready to begin its chilling cycle. When overlapped chilling is tried, it is found that the cold chiller stops chilling because of the increased compressor suction pressure when the gas is vented from the warm chiller. The high pressure warm vent gas available from the warm chiller off sets and replaces the low pressure gas flow from the cold chiller to the compressor suction. Because gas flow from the low pressure cold chiller is in effect stopped, the chilling in the cold chiller in effect is also stopped.

The use of thermocompressors in an overlapped batch chilling operation avoids the above recited difficulties.

A thermocompressor is a type of jet ejector used to handle large vapor loads at low pressures. They are typically used to produce intermediate pressure steam from exhaust, low pressure steam, utilizing high pressure steam. They are normally used in continuous stream flow environment, i.e., environments in which both the low pressure and high pressure streams are continuous flow streams.

It has been discovered that a thermocompressor can be utilized in propane batch chilling to compress low pressure propane from a cold chiller, using high pressure propane from the warm chiller into intermediate pressure propane sent to the recompressor which has been reconfigured to now operate at a higher suction pressure. The pressure of the new intermediate pressure propane stream is the new suction pressure.

This allows the effective and efficient overlapping of the batch chiller cycles since the passage of the high pressure propane through thermocompressor pulls the vapor from the low pressure cold chiller. It also is a useful way of lowering the pressure of the propane from the high pressure warm chiller down to the pressure of the propane recompression compressor suction. The discharge pressure of the thermocompressor would be the reconfigured compressor suction pressure which would be intermediate to the pressures in the warm and cold chillers.

By operating at a higher suction pressure (e.g. 40 psi) the propane recompression compressor would increase its capacity and/or reduce its energy consumption.

The flows to the thermocompressor would be switched between the different chiller vessels as the pressures of the streams from those vessels changed.

For so long as the high pressure vessel vents propane at above the suction pressure it would be deemed the high pressure stream source which runs the thermocompressor. When its pressure falls below the suction pressure it would become the low pressure stream source.

At the same time as vessel 1 is venting propane at above the suction pressure vessel 2 would be venting at below the suction pressure. These rates would be switched when the pressure from vessel 1 falls below the suction pressure. By that time vessel 2 would be charged with a solution of warm high pressure propane and oil and would begin high pressure venting, providing the high pressure stream which would be used to power the thermocompressor.

The low pressure vessel would be emptied before the pressure of the high pressure vessel fell too far below the initial high pressure. During this period the high pressure stream from the high pressure vessel would pass through the thermocompressor without expending any work in compressing low pressure propane up to the suction pressure. The thermocompressor would be functioning as a throttle reducing the pressure of the high pressure propane stream to the suction pressure of the propane recompressor, thus maintaining at a constant level the recompression compressor suction pressure.

Alternatively, the high pressure stream during such time as there is no low pressure stream upon which it can work in the thermocompressor can be bypassed around the thermocompressor and passed through a throttle valve to be stepped down to the suction pressure of the propane recompression compressor (e.g. 40 psi).

Just as the propane recompression compressor works most efficiently at a constant suction pressure, the thermocompressor also works most efficiently when provided with a constant pressure high pressure motive stream. This pressure can be set at any desirable level, e.g. 90 psi. To achieve this result the lines from the batch chiller vessels would have to be fitted with independent venturi flow control elements and throttle valves to insure that the pressure of the high pressure motive stream to the thermocompressor remains constant. In that embodiment, once the pressure of the high pressure stream fell below the preset minimum pressure (e.g. 90 psi), the flow to the thermocompressor would be bypassed so as not to upset the operation of the thermocompressor.

FIG. 1 presents a schematic of a batch chilling process configuration employing a thermocompressor.

Batch chillers A and B are run in sequence and not in parallel. When chiller A is discharging cold waxy oil slurry, chiller B is running in the chill-down mode.

Hot waxy oil/propane solution is charged to chiller A via line 1. When the chiller is fully charged to about 140 psia venting down to about 20 psia is begun. High pressure propane is vented through line 2. At the start of chiller A's high pressure venting sequence, chiller B, which started venting earlier through line 2a is venting at a lower pressure. The low pressure propane from chiller B, at a pressure lower than the suction pressure of the compressor (3) (e.g. <40 psi) is directed through low pressure line (4) to the thermocompressor (5). The thermocompressor boosts the pressure of this low pressure stream up to the suction pressure by using the high pressure propane stream from chiller A fed to the thermocompressor via line 6. Because the thermocompressor works best at a constant motive fluid pressure, the high pressure propane in line 6 is throttled to a constant pressure (e.g. 90 psi) by use of doll tube or venturi (6A). When the pressure of the high pressure propane in line 6 falls below the thermocompressor motive fluid pressure, flow through the thermocompressure is shut down and the propane is by-passed around the thermocompressor through line 8. During the period that the pressure of the high pressure propane is in excess of motive fluid pressure requirement of the thermocompressor, it runs the thermocompressor working on the low pressure propane from chiller B. That propane is at less than the suction pressure. As the pressure level continues to decrease in the low pressure chiller the operation of the thermocompressor creates a degree of suction in chiller B reducing the pressure there to possibly below atmospheric pressure, permitting chilling to be conducted to a level lower than would be possible had chiller B been permitted to vent to merely atmospheric pressure. Further, the suction created by the thermocompressor is such that air in leakage in the propane circuits is minimized as compared to other methods which could be used to reduce the pressure on chiller B to sub-atmospheric.

When chiller B is cold the solidified wax/liquid oil slurry is discharged to liquid/solid separation (not shown), the chiller is warmed up and recharged with hot propane/waxy oil charge. Chiller B then becomes the high pressure propane vent and chiller A the low pressure propane source, the roles of chillers A and B being reversed. Flow through the various lines is controlled by the different valves which are under the control of the process computer (7).

Propane at the suction pressure from the thermocompressor or via by-pass line 8 through valve 8a passes via line 9 to a knock out drum 10 and through the ballast vessel 11 which is maintained at a constant pressure insuring that the compressor (3) receives propane at the compressor suction pressure (in this case set at 40 psia). To insure that ballast vessel 11 is maintained at constant pressure, a recycle stream of hot compressed propane from compressor 3, line 15, can be used, if necessary. The compressor recompresses the propane to about 200 psia at a temperature of about 150° C. and passes it through. The hot, compressed propane gas is then condensed (e.g., by cold filtrate in condenser (13) and cooling water in condenser (12)).

A portion of the condensed propane is combined with waxy oil from line 14 and this waxy oil/propane solution is fed via line 1 or 1a into chiller A or B as appropriate. The remainder of the condensed propane may be added via lines 14 and 14a during chilling, as in conventional propane dewaxing.

EXAMPLE

Calculations were performed assuming typical propane dewaxing unit operating conditions. These typical conditions are as follows:

Start chill 29° C.
End chill −27° C.
Compressor suction=15 PSIA, 0° C.
Compressor discharge=200 PSIA, 150° C.
Compressor flow=34000 NMC/h for 65 MC/h charge rate
Compressor flow (max., 15 PSIA inlet)=35000 NMC/h
Chill time=20 min
Transfer time=6 min
Warmup time=4 min
Fill time=6 min
Wait time=4 min
Flow rates with carryover reduction program application on=35 NMC/h to −15° C.,=31 NMC/h to −27° C.
Chilling rate=2.80° C./min (2.88/2.55 with carryover reduction program)

The carryover reduction program is a computer application which reduces the vent rate at a predetermined temperature, in order to prevent carryover of liquid into the vent line. This occurs near the end of the chilling cycle, because as the vapor density decreases with decreasing batch temperature and pressure, the volumetric flow increases to maintain constant mass flow rate. With the program on, the vent rate must be increased slightly during the first part of the chilling cycle in order to compensate for the slower chilling rate during the last part of the cycle. Based on the above data, the chilling rate must be less than 2.55° C./min when the temperature is less than −15° C., to prevent carryover.

The cases tested are shown in Table 1. The nomenclature used is shown in FIG. 2.

Figure 2:
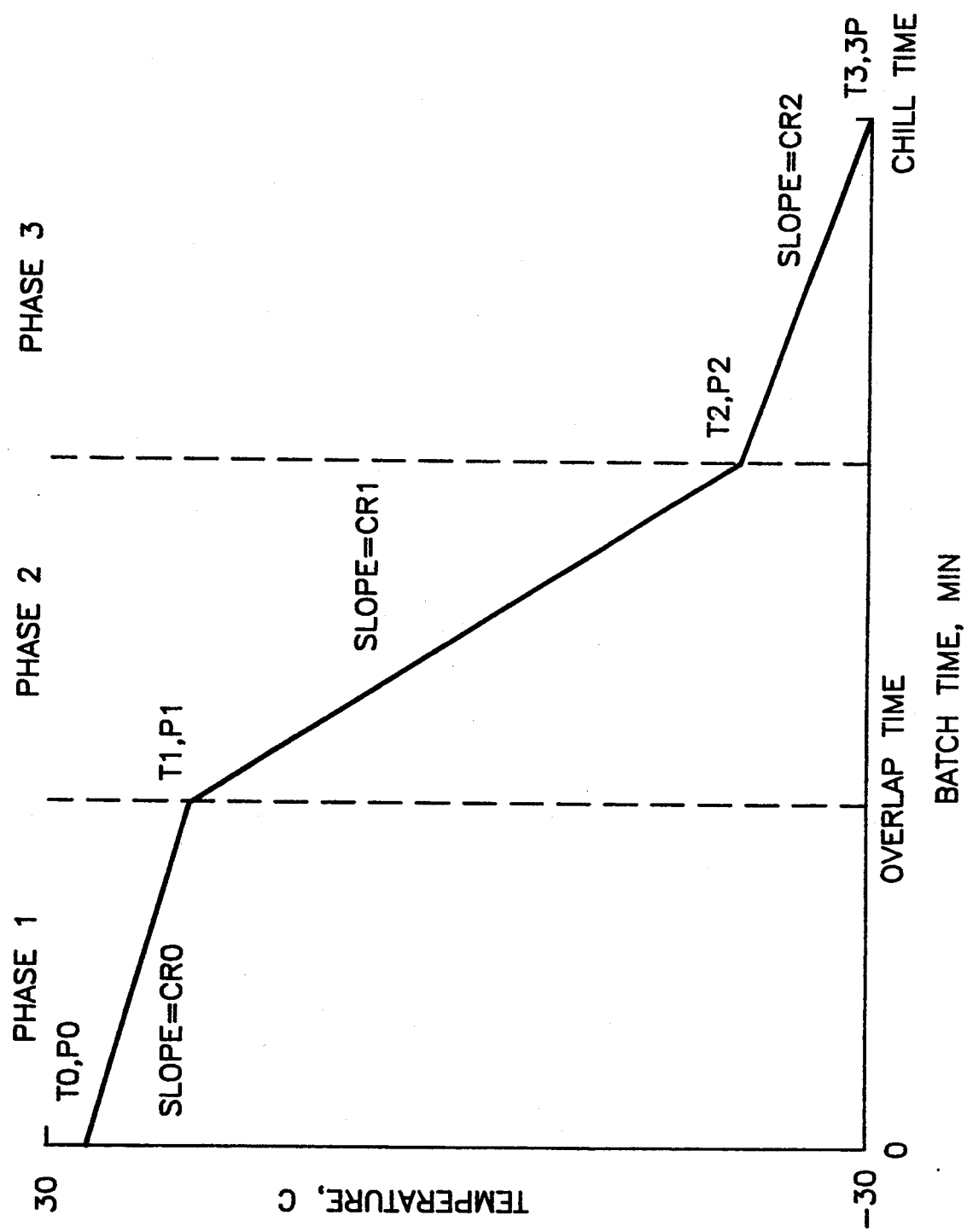
FIG. 2 is a graphical representation of temperature versus batch chilling time showing the relationship between temperature, pressure and chilling rate for the different phases in the chilling cycle.

FIG. 2 is a graphical representation of temperature versus batch chilling time showing the relationship between temperature, pressure and chilling rate for the different phases in the chilling cycle. In FIG. 2 To, Po and CRO are the temperature, pressure and chilling rate at the beginning of phase 1. FIG. 2 is to be read in conjunction with the case studies of Table 1 and is presented to assist the practitioner in correlating the information in Table 1 with the various step and phases in the case studies of the batch chiller operation.

Figure 3:
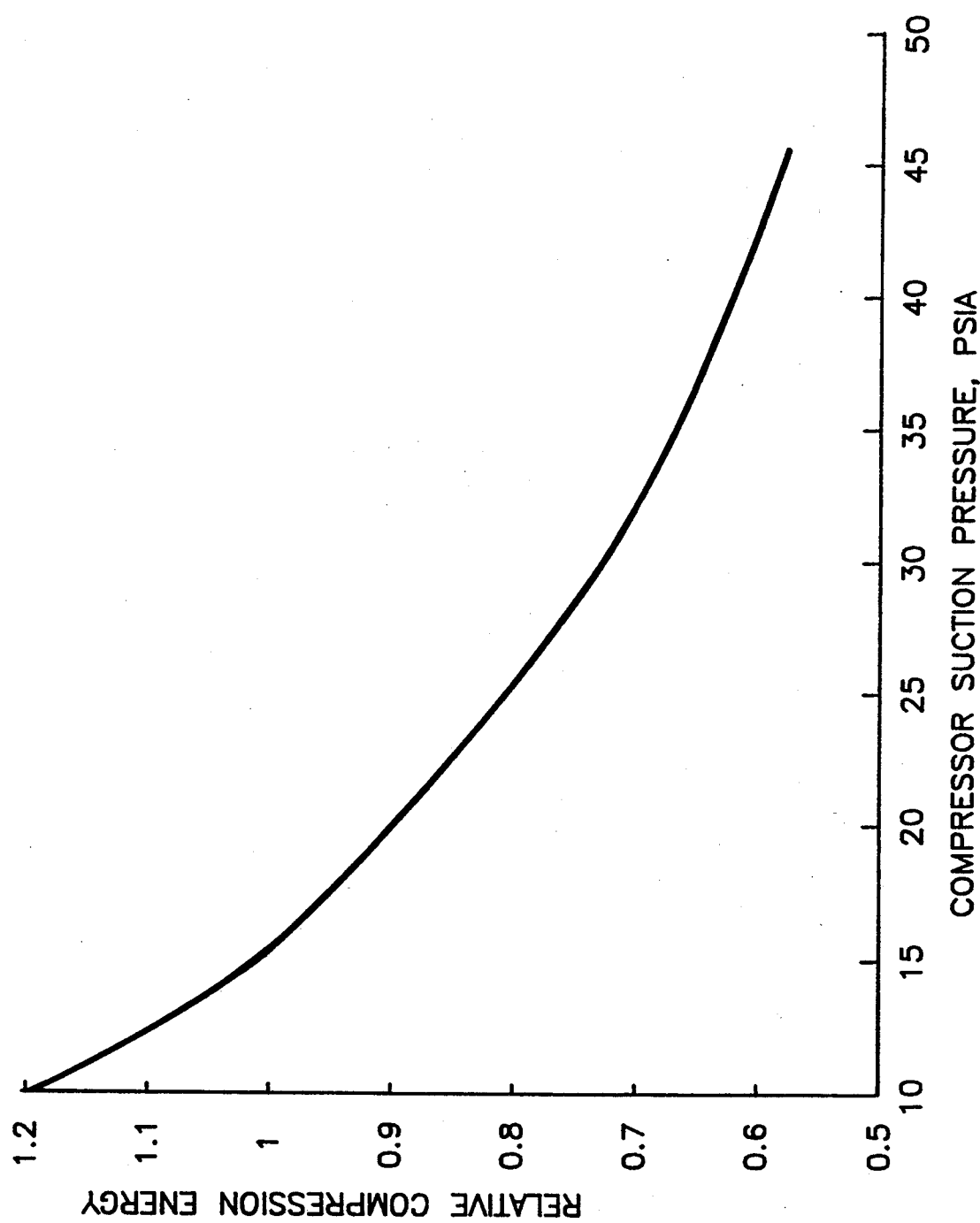
FIG. 3 shows the projected potential compression energy savings with increased suction pressure.

FIG. 3 shows the relationship between compressor suction pressure and recompression energy required, for constant mass flow and constant discharge pressure.

This figure is based on the thermodynamic properties of propane and uses a compressor efficiency typical of propane dewaxing compressors.

Case 1 represents the current operation without the carryover reduction program, and case 2 is operation with the program on. In cases 3–7, an overlap time of 8 minutes and batch time of 30 minutes was assumed. This results in a batch transfer to the filters every 20 minutes, the same as the base case. The chilling rates during the three phases of chilling (high temperature overlapping with the other chiller at low temp, no overlap, and low temperature overlapping with the other chiller at high temperature) were adjusted in order to maximize performance. The performance criterion were to maximize the compressor suction pressure and to minimize fluctuations in the compressor mass flow rate. In cases 6 and 7 the mass flow rate is constant and the thermocompressor discharge pressure varies between 98 and 41 PSIA. Thus the compressor suction pressure controller would be set for 41 PSIA in these cases.

In the current operation the compressor suction pressure is 15 PSIA, while the equilibrium pressure of propane at the final chill temperature is 27 PSIA. The difference of 12 PSIA can be attributed to the use of pure propane vapor pressure in the calculations and to the pressure drop in piping and flow element. The same pressure delta was used in determining the energy savings for case 7. At a suction pressure of $41-12=29$ PSIA, the energy reduction from FIG. 5 is 29%. Assuming this can be translated directly into increased capacity, this raises the compressor capacity from 35000 NMC/h (chilling rate of 2.8° C./min) to 49000 MNC/h (4.0° C./min).

In cases 8 and 9, the chilling rates found in case 7 were increased until a constraint was reached. Case 8 represents the constraint of 2.55 chilling rate during the final part of chilling, in order to prevent chiller carryover. However, the maximum chilling rate of 4.0° C./min is exceeded during the second phase. In case 9, the maximum chilling rate of 4.0 is used in the second phase, resulting in an overall chilling time of 21 minutes with a 7 minute overlap time (batch transfer every 14 minutes).

Thus for case 9 the compressor energy savings are zero, and the chiller capacity increase is 43%. The energy savings available due to the use of the invention can be used to increase the challenge rate and therefore capacity. The capacity increase is calculated directly for the batch times, e.g., $$\frac{\frac{1}{14 \text{ min.}} - \frac{1}{20 \text{ min.}}}{\frac{1}{20 \text{ min.}}} = 43\%$$

This gives only 7 minutes during phase 2 for transfer and fill steps (phase 2 times = BT − OT). Case 10 increases this to 8 minutes. Cases 11–14 increases the time available for transfer/fill even more to 12 minutes. Case 14 does not meet the constraint for no chiller carryover.

Case 10 illustrates how both energy savings and capacity increase can be achieved. The batch time is increased from 14 minutes in case 9 to 16 minutes, giving a 25% capacity increase over the base case of 20 minutes. This would result in energy use of 1.25 times the base case if this invention were not practiced. Since the compressor suction pressure with practice of the invention is the same as case 7, energy reduction is 29% of 1.25, or 0.36. The actual energy use is then $1.25-0.36=0.89$, an 11% reduction over the base case.

It should be noted that in case 6–14 inclusive, the total mass flow to the compressor is constant while going from phase 1 through 3. This is evident from the fact that the chilling rates of the overlap phases (CR0 and CR2) add to give the chilling rate in the non-overlap phase (CR1).

TABLE 1

CASE STUDY OF PROPANE DEWAXING USING A THERMOCOMPRESSOR

Chilling range = 29 to −27 C. (153 to 27.5 PSIA)
Compressor Suction = 0 C. 15 PSIA

| Case | OT | CT | BT | T1 | P1 | T2 | P2 | CR0 | CR1 | CR2 | Ps | Pm | E | F2/F0 = CR2/C | K | Pd = K*Ps | Energy reduction % | Capacity increase % |
|---|---|---|---|---|---|---|---|---|---|---|---|---|---|---|---|---|---|---|
| 1 | 0 | 20 | 20 | | | | | 2.80 | 2.80 | 2.80 | 153–27 | | | | | | 0 | 0 |
| 2 | 0 | 20 | 20 | | | | | 2.88 | 2.88 | 2.55 | 153–27 | | | | | | | |
| 3 | 10 | 30 | 20 | 9 | 90 | −7 | 55 | 2.0 | 1.6 | 2.0 | 55–27 | 153–90 | 2.9–3.3 | 1.00 | 1.31–1.34 | 72–36 | | |
| 4 | 10 | 30 | 20 | 9 | 90 | −21 | 34 | 2.0 | 3.0 | 0.6 | 34–27 | 153–90 | 4.5–3.3 | 0.30 | 2.00–1.87 | 68–51 | | |
| 5 | 10 | 30 | 20 | 13 | 100 | −17 | 40 | 1.6 | 3.0 | 1.0 | 40–27 | 153–100 | 3.8–3.7 | 0.63 | 1.58–1.57 | 63–42 | | |
| 6 | 10 | 30 | 20 | 13 | 100 | −15 | 42 | 1.6 | 2.8 | 1.2 | 42–27 | 153–100 | 3.6–3.7 | 0.75 | 1.49–1.50 | 63–41 | | |
| 7 | 10 | 30 | 20 | 12 | 98 | −16 | 41 | 1.7 | 2.8 | 1.1 | 41–27 | 153–98 | 3.7–3.6 | 0.65 | 1.55–1.54 | 64–42 | 29 | 0 |
| 8 | 10 | 30 | 20 | 12 | 98 | −16 | 41 | 3.9 | 6.5 | 2.55 | 41–27 | 153–98 | 3.7–3.6 | 0.65 | 1.55–1.54 | 64–42 | | |
| 9 | 7 | 21 | 14 | 12 | 98 | −16 | 41 | 2.43 | 4.0 | 1.57 | 41–27 | 153–98 | 3.7–3.6 | 0.65 | 1.55–1.54 | 64–42 | 0 | 43 |
| 10 | 8 | 24 | 16 | 12 | 98 | −16 | 41 | 2.13 | 3.5 | 1.37 | 41–27 | 153–98 | 3.7–3.6 | 0.65 | 1.55–1.54 | 64–42 | 14 | 25 |
| 11 | 6 | 24 | 18 | 17 | 112 | −20 | 35 | 2.0 | 3.11 | 1.11 | 35–27 | 153–112 | 4.4–4.1 | 0.56 | 1.70–1.66 | 60–45 | | |
| 12 | 6 | 24 | 18 | 19 | 118 | −19 | 37 | 1.71 | 3.11 | 1.4 | 37–27 | 153–118 | 4.1–4.4 | 0.82 | 1.48–1.50 | 55–41 | | |
| 13 | 6 | 24 | 18 | 19 | 118 | −18 | 38 | 1.66 | 3.11 | 1.45 | 38–27 | 153–118 | 4.0–4.4 | 0.87 | 1.44–1.46 | 55–39 | 0 | 11 |
| 14 | 4 | 20 | 18 | 22 | 127 | −20 | 36 | 1.8 | 3.6 | 1.8 | 36–27 | 153–127 | 4.3–4.7 | 1.00 | 1.39–1.39 | 50–38 | 0 | 29 |

TABLE 1-continued

CASE STUDY OF PROPANE DEWAXING USING A THERMOCOMPRESSOR

Chilling range = 29 to −27 C. (153 to 27.5 PSIA)
Compressor Suction = 0 C. 15 PSIA

| Case | OT | CT | BT | T1 | P1 | T2 | P2 | CR0 | CR1 | CR2 | Ps | Pm | E | F2/F0 = CR2/C | K | Pd = K*Ps | Energy reduction % | Capacity increase % |
|---|---|---|---|---|---|---|---|---|---|---|---|---|---|---|---|---|---|---|
| | | | | | | | | | | | | | 1.41 | | | | | |

Notes:
OT = overlap time, min
CT = chill time, min
BT = Batch time, min
T1, T2 = batch temperature, C. (see FIG. 2)
P1, P2 = batch pressure, PSIA (see FIG. 2)
CR0, CR1, CR2 = Chilling rates, C./min (see FIG. 2)
Ps = Thermocompressor suction gas pressure, PSIA
Pm = Thermocompressor motive gas pressure, PSIA
E = degree of expansion = Pm/Ps
F2/F0 = Thermocompressor flow ratio = CR2/CR0
K = degree of compression = Pd/Ps
Pd = Thermocompressor discharge pressure, PSIA = K*Ps
Energy reduction = existing compressor energy reduction (based on FIG. 3)
Capacity increase = existing chiller capacity increase based on constant fill level operation

What is claimed is:

1. A method for improving the energy efficiency and increasing the chiller capacity of and production of lower pour point dewaxed oil in a batch autorefrigeration solvent dewaxing chilling process comprising running the batch autorefrigerative solvent dewaxing process employing at least first and second dewaxing chiller vessels running sequentially, wherein operation of the vessels is integrated through a thermocompressor;

charging waxy oil to be dewaxed and hot-high pressure auto- refrigeration dewaxing solvent to the first vessel and the second vessel;

venting hot-high pressure autorefrigeration solvent from the second vessel to effect the chilling of the waxy oil present therein;

subsequently venting hot high-pressure autorefrigeration solvent from the first vessel to effect the chilling of the waxy oil present therein while the second vessel is still venting;

passing the hot-high pressure autorefrigeration solvent venting from the first vessel to the thermocompressor to enable such thermocompressor to pull and recompress cool, low-pressure autorefrigerant venting from the second chiller which is further along in its chilling cycle as compared to the first chiller;

passing the compressed low pressure autorefrigerative dewaxing solvent from the thermocompressor to a recompression compressor for further compression into high pressure auto refrigeration dewaxing solvent for reuse in the dewaxing process;

recharging the second vessel with waxy oil and autorefrigeration dewaxing solvent, while the first vessel is still venting;

venting hot high pressure autorefrigerative solvent from the second vessel while the first vessel is still venting;

switching the flow to the thermocompression to now pass the hot-high pressure autorefrigeration solvent venting from the second vessel to the thermocompressor to enable such thermocompressor to now pull and recompress cool, low pressure autorefrigerative dewaxing solvent venting from the first vessel which is now further along in its chilling cycle as compared to the second vessel;

passing the compressed low pressure autofrigerative dewaxing solvent from the thermocompressor to a recompression compressor for further compression into high pressure autorefrigerative dewaxing solvent for reuse in the dewaxing process;

repeating the charging, venting, cycled passage of venting auto- refrigerative solvent to the thermocompressor, and recompressor steps whereby through the overlapping of the chilling cycles of the batch chillers continuous flows of low pressure and high pressure autorefrigerative dewaxing solvent stream are available to the thermocompressor permitting the efficient operation of the thermocompressor and resulting in the increase in the efficiency of the batch autorefrigeration dewaxing process.

* * * * *